United States Patent [19]
Goodridge et al.

[11] Patent Number: 6,024,555
[45] Date of Patent: Feb. 15, 2000

[54] TOOLING HAVING COMPLIANT FORMING SURFACE FOR FORMING RESIN COMPOSITES

[75] Inventors: Harold M. Goodridge, Seattle; Kirk D. Skaggs, Federal Way, both of Wash.

[73] Assignee: The Boeing Company, Seattle, Wash.

[21] Appl. No.: 08/956,331

[22] Filed: Oct. 23, 1997

Related U.S. Application Data

[62] Division of application No. 08/544,969, Oct. 30, 1995, Pat. No. 5,714,179.

[51] Int. Cl.[7] .............................. B29C 33/42; B29C 70/42
[52] U.S. Cl. .......................... 425/394; 249/112; 264/313; 425/403; 425/DIG. 44
[58] Field of Search ................................... 425/394, 403, 425/DIG. 44; 204/313; 249/112

[56] References Cited

U.S. PATENT DOCUMENTS

| | | | |
|---|---|---|---|
| H1162 | 4/1993 | Yamamoto et al. | 156/224 |
| 1,358,903 | 11/1920 | Weida | 425/394 |
| 2,172,466 | 9/1939 | Edwardes et al. | 425/DIG. 44 |
| 2,336,578 | 12/1943 | Skonig | 249/112 |
| 2,783,521 | 3/1957 | Vondrous et al. | 249/112 |
| 3,974,122 | 8/1976 | Sato et al. | |
| 4,095,322 | 6/1978 | Scarpati et al. | 156/245 |
| 4,191,510 | 3/1980 | Teysseyre et al. | 416/244 A |
| 4,316,701 | 2/1982 | Scarpati et al. | 416/226 |
| 4,350,486 | 9/1982 | Croseck et al. | 425/DIG. 44 |
| 4,621,980 | 11/1986 | Reavely et al. | 416/226 |
| 4,626,173 | 12/1986 | Mouille et al. | 416/134 A |
| 4,639,284 | 1/1987 | Mouille et al. | 264/258 |
| 4,654,098 | 3/1987 | Miller | 156/182 |
| 4,693,678 | 9/1987 | Von Volkli | 425/417 |
| 4,940,847 | 7/1990 | Gramberger | 264/60 |
| 4,946,369 | 8/1990 | Beck et al. | 264/338 |
| 5,069,737 | 12/1991 | Guiton | 156/245 |
| 5,091,031 | 2/1992 | Strapazzini | 264/511 |
| 5,104,472 | 4/1992 | Kasugai et al. | 264/516 |
| 5,134,002 | 7/1992 | Vallier | 249/112 |
| 5,135,382 | 8/1992 | Tsuchiya et al. | 425/394 |
| 5,435,949 | 7/1995 | Williamson et al. | 264/313 |

FOREIGN PATENT DOCUMENTS

| | | | |
|---|---|---|---|
| 2360612 | 6/1974 | Germany | 425/394 |
| 3644144 | 7/1988 | Germany | 425/394 |
| 60-139433 | 7/1985 | Japan . | |
| 60-206618 | 10/1985 | Japan | 425/389 |
| 636108 | 12/1978 | U.S.S.R. | 249/112 |

*Primary Examiner*—Robert Davis
*Attorney, Agent, or Firm*—John C. Hammar

[57] ABSTRACT

A tooling concept uses a compliant forming surface for forming composite parts. The tooling concept utilizes a rigid support substructure that has a thin compliant forming surface. In the preferred embodiment of the invention, the tooling concept is used to form a composite sine wave spar. A preferred embodiment of the tooling concept includes upper and lower tool inserts and side tool inserts. The upper tool insert has a compliant forming surface that is located in between a rigid support substructure and the composite material used to form the composite part. Composite prepreg is laid up over a sine wave contour on the upper and lower tool inserts to form upper and lower U-shaped composite workpieces. The upper and lower tool inserts and workpieces are then brought together to form a sine wave I-beam. Radius fillers are then applied to the intersections between the upper and lower composite workpieces and cap strips are placed over the flanges of the joined composite workpieces. Side tools and end tools are then placed around the joined upper and lower tool inserts. The resulting assembly is covered with a breather cloth, baked in a vacuum bag and cured in an autoclave. During curing, the autoclave applies a hydrostatic pressure on the upper tool insert and thus compliant forming surface. The compliant forming surface in turn applies a consolidation and forming pressure to the composite workpiece within the tools. During curing, the compliant forming surface deforms slightly to account for thickness variations in the composite workpiece in order to produce a better quality formed composite part.

18 Claims, 6 Drawing Sheets

TOOLING HAVING COMPLIANT FORMING SURFACE FOR FORMING RESIN COMPOSITES

REFERENCE TO RELATED APPLICATION

The present application is a divisional application based upon U.S. patent application Ser. No. 08/544,969, filed Oct. 30, 1995 and now U.S. Pat. No. 5,714,179.

NOTICE OF GOVERNMENT RIGHTS

This invention was made with Government support by Contract No. F33657-91-C-0006 awarded by United States Air Force. The Government has certain rights in this invention.

FIELD OF THE INVENTION

The invention relates to apparatus for forming and curing composite materials, and more particularly, to tooling having a compliant forming surface for forming and curing of composite materials to form high quality composite parts with tight tolerance control on more than one surface of the part.

BACKGROUND OF THE INVENTION

The use of high strength fiber reinforced composite materials in the manufacture of aircraft and other lightweight structures has increased steadily since the introduction of such materials. Composite materials have a high strength-to-weight ratio and stiffness. These properties make composite materials attractive for use in the design of lightweight structures. Some of the drawbacks to using composite materials have been relatively high fabrication costs and difficulties in manufacturing defect-free parts. Generally, it has been difficult to produce parts formed of high strength composite materials at the same cost as comparable metal parts. It has also been difficult to fabricate composite parts in which tight dimensional tolerances are required on opposing surfaces or multiple surfaces of the formed composite part.

When it is necessary to fabricate composite parts having tight dimensional tolerances on multiple surfaces, it is generally necessary to use matched rigid tooling. In matched rigid tooling, two or more tools having forming surfaces that establish the final part dimensions are used. Once assembled, the forming surfaces of such rigid tooling define the final formed composite part's dimensions. Therefore, matched rigid tooling must be carefully fabricated to ensure that the tools fit together properly to ensure proper part dimensions. Inaccuracies in either the way the tools fit together or in the forming surfaces on any of the tools can result in defects in the formed composite part. Because of the tight machining tolerances required on matched rigid tooling, such tooling tends to be expensive to fabricate, thus increasing overall part fabrication costs.

The difficulties associated with fabricating high quality composite parts with rigid matched tooling is increased by variations in the quality and thickness of uncured composite materials. High-strength composite parts in the aerospace industry are generally fabricated using composite prepreg material. Such prepreg material consists of unidirectional fibers or cloths of graphite, fiberglass, Kevlar®, etc., contained within a matrix material such as an epoxy, bismaleimide, or thermoplastic material. The thickness of individual layers of composite prepreg differs slightly between batches of prepreg and even within the same batch of prepreg. Therefore, the thickness of a workpiece formed of multiple layers of prepreg differs from workpiece to workpiece. Such differences in thickness from workpiece to workpiece can result in differences in the thickness of the final formed composite parts.

When matched rigid tooling is used, the forming surfaces of the tools generally cannot account for the differing thicknesses in the prepreg used. Therefore, if the prepreg used to form the composite part is slightly thicker than normal, portions of the formed composite part will have a lower percentage of resin than desirable. In extreme cases, the increased thickness of the composite prepreg can prevent the matched rigid tooling from fitting together properly, thus leading to tolerance problems on the surface of the formed composite part. Similarly, if the prepreg used is slightly thinner than normal, the use of the matched rigid tooling does not account for the thickness variations, thus resulting in a resin-rich formed composite part.

It would be desirable if a system of composite tooling was developed that could produce composite parts with tight tolerance control on multiple surfaces. At the same time, it would be advantageous if such a tooling method could eliminate the need for expensive matched rigid tooling.

As can be seen from the above discussion, there exists a need for a method of forming composite parts that can maintain dimensional tolerances, while reducing the disadvantages of the prior art. The present invention is directed toward fulfilling this need.

SUMMARY OF THE INVENTION

The present invention is an improved tooling concept for forming composite parts. In the preferred embodiment of the invention, the formation of a composite sine wave span is disclosed. The tooling concept includes one or more tools that have a compliant forming surface that is able to account for slight thickness variations in the composite material used to form the workpiece. The compliant forming surface also allows the tooling concept to account for slight variations in the placement of individual plys of prepreg during the lay up process. The tooling concept allows for such variations, while maintaining dimensional tolerances on the surface of the part and producing a high-quality formed composite part.

In one embodiment of the invention, the tooling system includes first and second tools that are placed in an opposing relationship to at least partially define the geometry of the composite part being formed. At least one of the tools includes a compliant forming surface that is contoured to contact and form one surface of the composite part. The compliant forming surface is supported by a rigid substructure that provides structural integrity to the compliant forming surface. The compliant forming surface forms a covering of a generally constant thickness over the rigid substructure. During forming, the compliant forming surface contacts the composite material and applies a consolidation and forming force to the composite material to produce the composite part. The dimensions of the forming surface of the compliant forming surface defines the final part dimensions of the formed composite part in the areas of the composite part that contact the compliant forming surface.

In accordance with further aspects of the invention, the tooling system is used to form a composite sine wave spar. The sine wave spar tooling includes a rigid lower tool insert and an upper tool insert having a compliant forming surface. The sine wave spar tooling also includes side forming tools that have rigid forming surfaces that define the dimensions of the exterior surfaces of the formed sine wave spars caps.

In accordance with other aspects in the invention, the rigid substructure includes a plurality of recesses. The recesses are sized to accommodate tabs that extend outward from the surface of the compliant forming surface. When assembled, the tabs on the compliant forming surface extend into the recesses to hold the compliant forming surface on the rigid substructure.

A method for forming composite parts using tooling with a compliant forming surface is also disclosed.

The invention's use of tooling having a compliant forming surface placed over a rigid support structure has a number of advantages over prior tooling concepts. The compliant forming surface can deform slightly during curing. This allows the compliant forming surface to accommodate slight thickness variations from composite workpiece to composite workpiece. The compliant forming surface accounts for such thickness variations while maintaining dimensional tolerances on the surface of the formed composite part. In addition, the invention's use of a compliant forming surface reduces tooling costs when compared to similar prior art matched rigid tooling. Because the compliant forming surface can be formed in a casting operation, it is not necessary to closely machine match rigid tools to produce close tolerances on the formed composite part.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED OF THE PREFERRED EMBODIMENT

The present invention relates to apparatus to fabricate and cure composite materials to form a composite part. The invention is described below with respect to a preferred embodiment used to form a sine wave spar 20. However, the method and apparatus of the invention may be used to form a wide variety of composite structures. Similarly, the present invention is described below with respect to forming a composite sine wave spar out of fiber-reinforced epoxy-based prepreg composites. However, the present invention may be used with various composite materials, including composite prepregs having an epoxy or bismaleimide matrix reinforced with either uni-directional or cloth fiber, such as fiberglass, graphite or Kevlar®.

Figure 1:
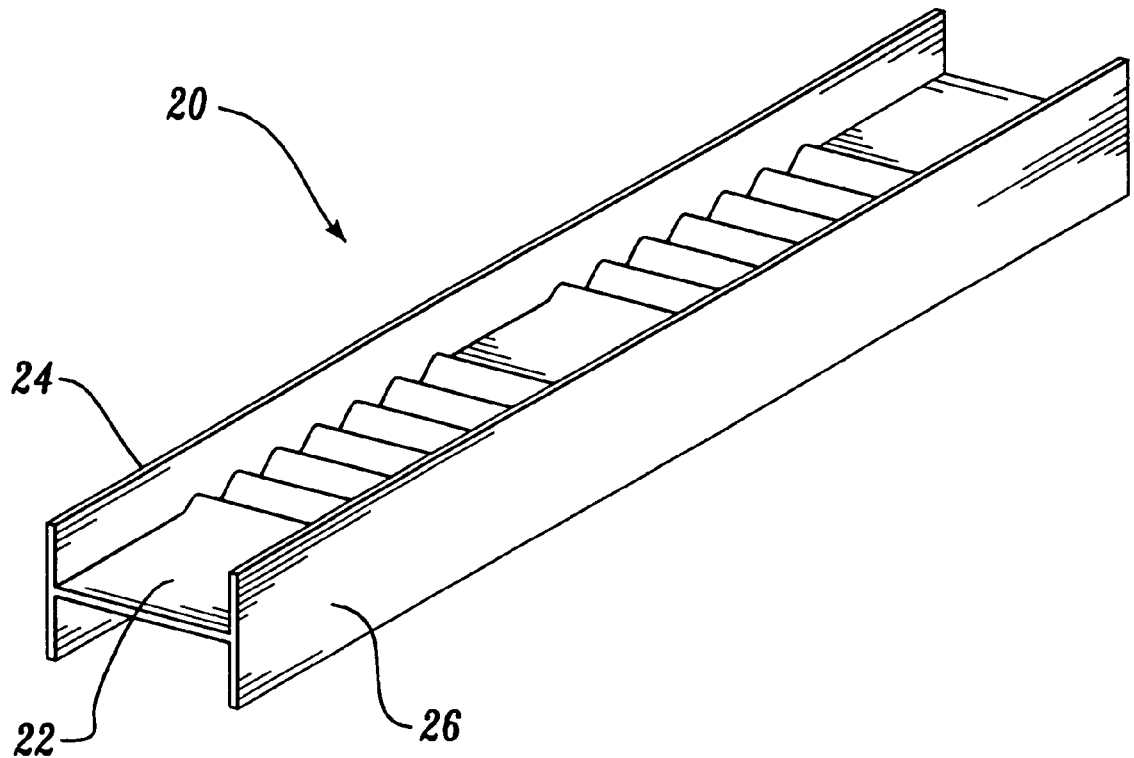
FIG. 1 is a perspective view of a sine wave spar formed in accordance with a method of the present invention.

FIG. 1 illustrates a sine wave spar 20 fabricated using a compliant tooling concept 21 (FIG. 2) according to the invention as described below. As best illustrated in FIG. 1, the sine wave spar 20 is generally an I-beam having a sine wave central web 22 that extends between opposing left and right spar caps 24 and 26, respectively.

In the preferred embodiment, it is important to maintain the tightest dimensional tolerances upon the exterior surfaces of the spar caps 24 and 26 and on the lower surface of the central web 22. It is also important to maintain fairly tight dimensional tolerances on the upper surface of the central web 22 and the interior surfaces of the spar caps 24 and 26. However, the tolerances required on the upper surface of the central web 22 and the interior surfaces of the spar caps 24 and 26 are not as severe as the lower surface of the central web and exterior surfaces of the spar caps.

Figure 2:
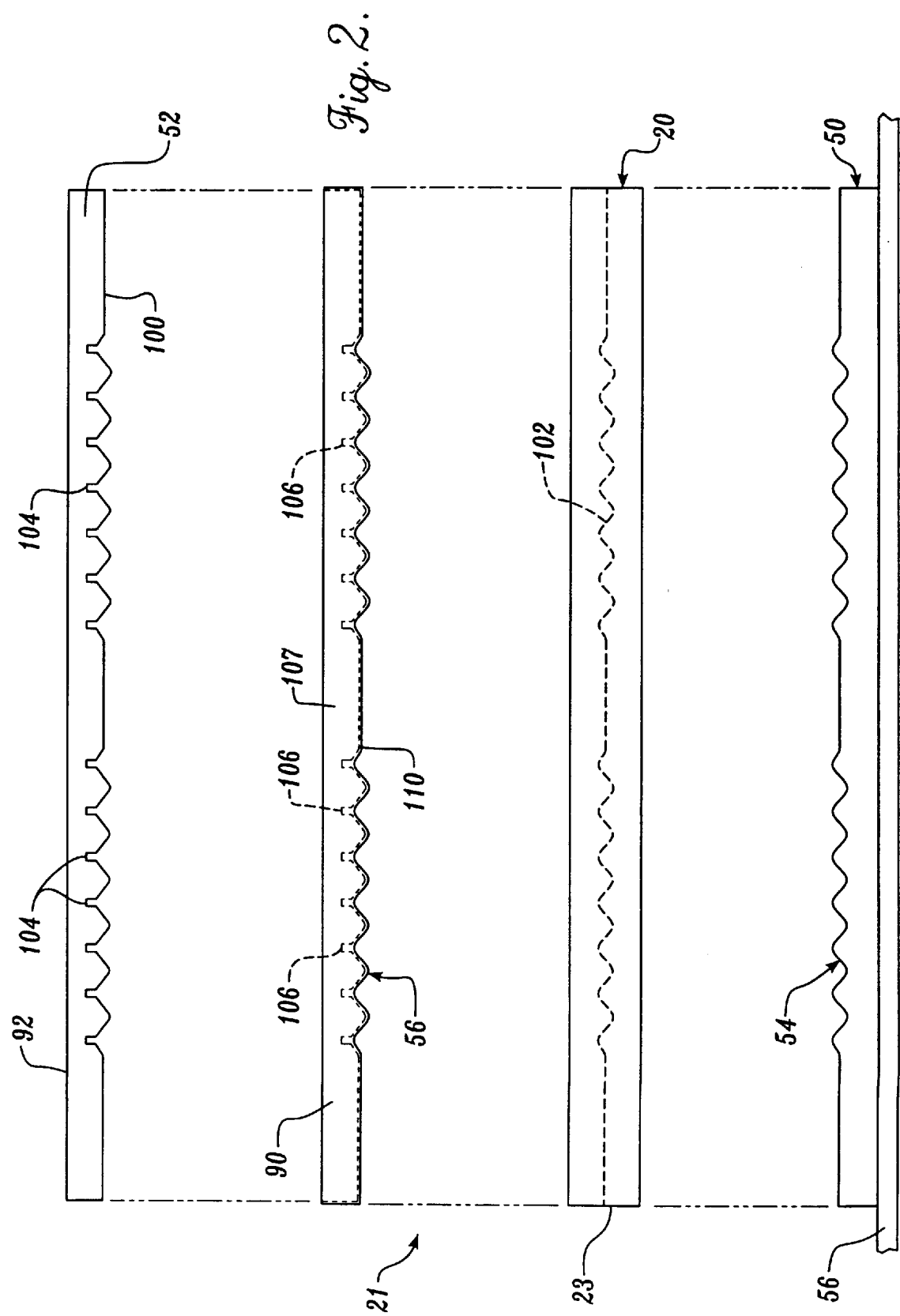
FIG. 2 illustrates a side exploded view of an embodiment of sine wave spar tooling used to form the sine wave span of FIG. 1.

In the preferred embodiment, the sine wave spar 20 is fabricated using subassemblies formed of layers of composite prepreg that are joined together in an assembly process to form a composite workpiece 23 (FIG. 2). The composite workpiece 23 and tooling concept 21 is then placed under a vacuum bag or diaphragm and compacted with high vacuum to remove all available atmosphere and placed within an autoclave (not shown) and the composite workpiece is cured to form the finished composite sine wave spar 20.

Although, the preferred embodiment of the invention is described below with respect to the use of an autoclave, the invention could also be used with other fabrication equipment. For example, a rigid backed tooling concept with a compliant forming surface according to the invention could be used in a heated press as opposed to an autoclave or within a vacuum bag in a furnace for lower viscosity resin.

In the preferred embodiment, the composite workpiece 23 used to form the sine wave spar 20 is assembled from preformed subassemblies including lower and upper U-shaped channels 36 and 38 (FIG. 5), left and right radius fillers 40 and 42, and left and right cap strips 44 and 46. The lower and upper U-shaped channels 36 and 38 are formed by laying up individual layers of composite prepreg material over lower and upper tool inserts 50 and 52 (FIGS. 2 and 5), respectively. Each tool insert 50 and 52 is generally rectangular and includes a forming surface 54 and 56 (FIG. 5), respectively. Each forming surface 54 and 56 has a sine wave contour corresponding to the contour desired on the central web 22 of the formed composite part.

Figure 3:
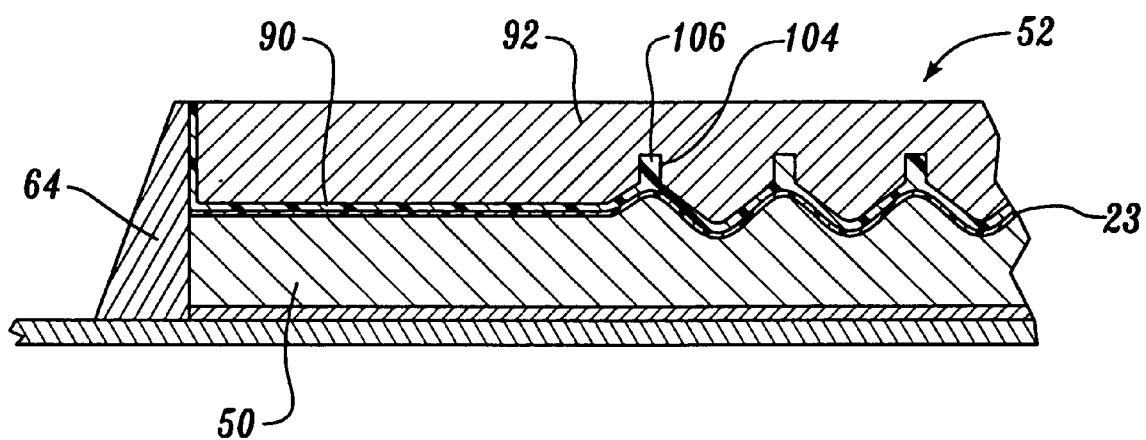
FIG. 3 is a longitudinal cross-section of a portion of the assembled sine wave spar tooling of FIG. 2.
Figure 4:
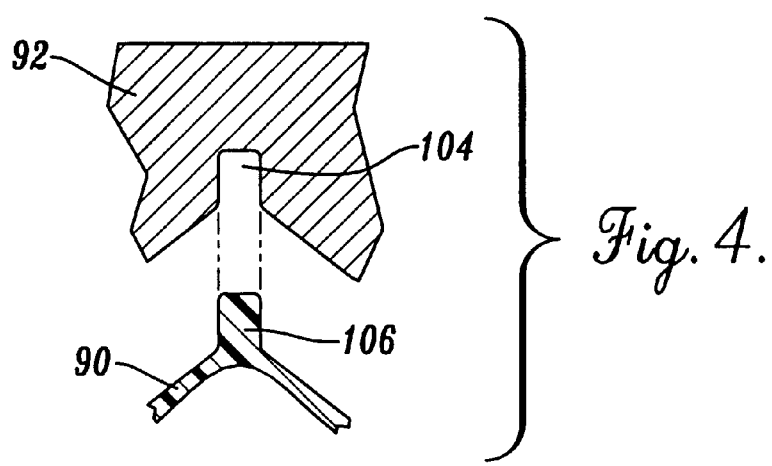
FIG. 4 is an enlarged exploded view of a portion of the upper tool insert of FIG. 3.

As described in detail below, in the preferred embodiment, the upper tool insert 52 includes a compliant forming surface 90 (FIGS. 2 and 3) and a rigid support substructure 92. The compliant forming surface 90 helps to apply a consistent consolidation pressure to the composite workpiece 23 during forming and curing, thus helping to produce a higher quality part. The structure and operation of the compliant forming surface 90 and rigid support substructure 92 is described in more detail below.

Figure 5:
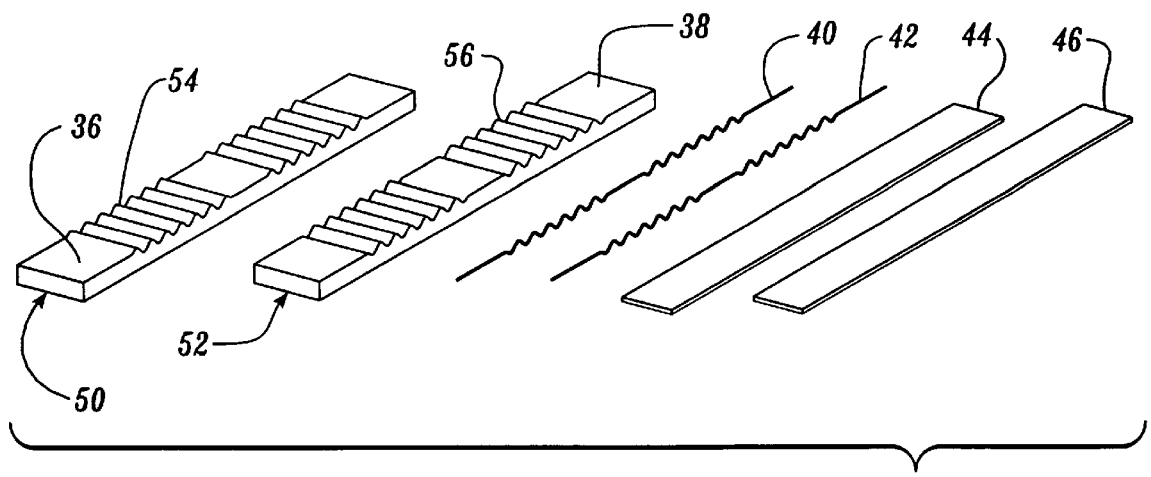
FIG. 5 is a perspective view of the upper and lower tool inserts and composite subassemblies used to form the sine wave spar.

Layers of composite prepreg material are laid up on the forming surfaces 54 and 56 so that the layers of prepreg follow the sine wave contour and wrap around the opposing edges of the tool inserts 50 and 52 to form the flanges of the lower and upper U-shaped channels 36 and 38 (FIG. 5). The layers of composite prepreg material can be placed over the tool inserts 50 and 52 using hand lay-up procedures, automated tape laying equipment, or other appropriate fabrication methods.

The left and right cap strips 44 and 46 (FIG. 5) are formed by laying up individual layers of composite prepreg material on a tool (not shown) having a surface corresponding to the contour of the edges of the upper and lower tool inserts 50 and 52. The left and right cap strips 44 and 46 can be laid up by hand, using an automated tape-laying equipment, or other appropriate fabrication method.

The left and right radius fillers 40 and 42 have a triangular cross section and are formed by hand lay-up, pultrusion, or other appropriate fabrication methods. Methods for laying up composite prepreg materials over tools and for fabricating radius fillers and cap strips are well known by those of ordinary skill in the art.

Figure 6:
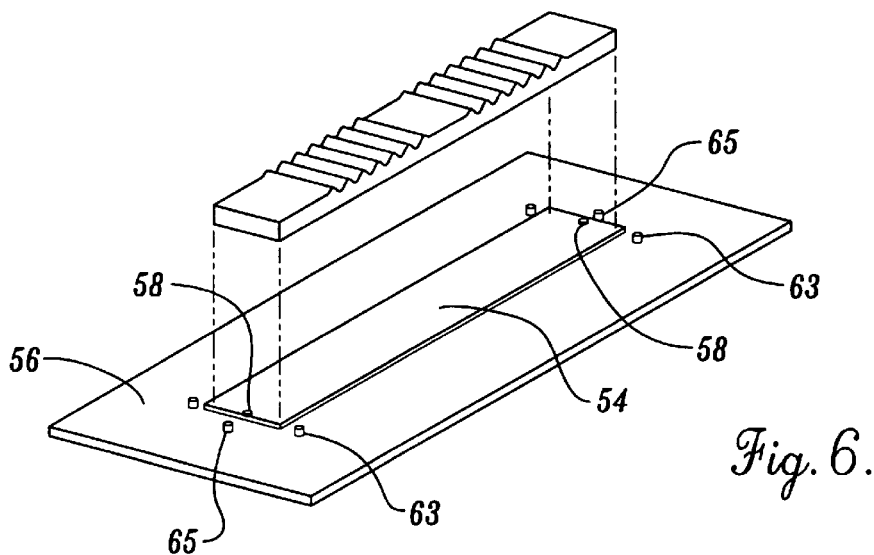
FIG. 6 is a partially exploded view of the lower tool insert and base plate.

After the lower and upper U-shaped channels 36 and 38 are fabricated, the lower tool insert 50 is placed on a flat gauge sheet 54 (FIG. 6). The gauge sheet 54 is mounted on a rigid rectangular base plate 56. The base plate 56 has a larger surface area than the gauge sheet 54 and supports the sine wave spar tooling during processing, as described below.

Figure 7:
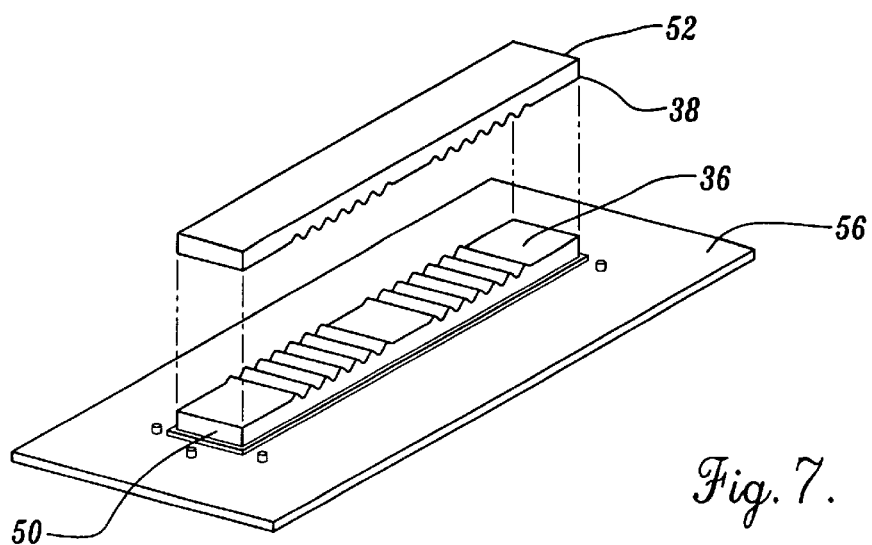
FIG. 7 is a partially exploded view of the upper and lower tool inserts and base plate.
Figure 8:
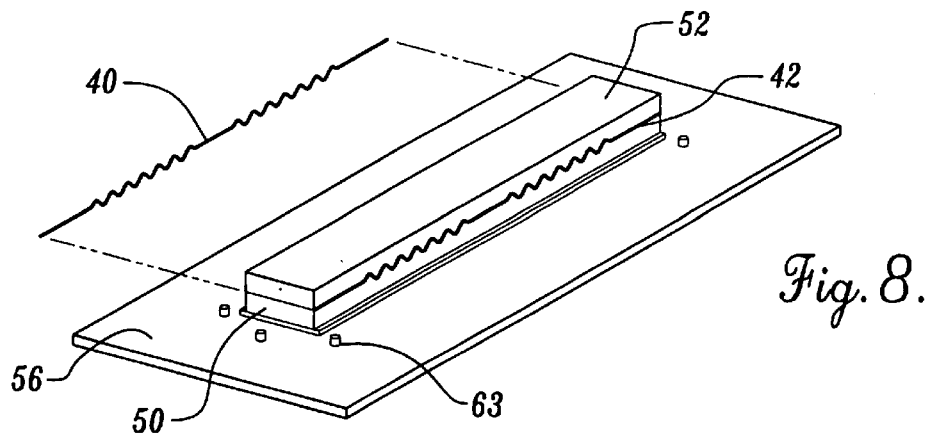
FIG. 8 is a partially exploded view of the upper and lower tool inserts and radius fillers.

The lower tool insert 50 is indexed in a predetermined location on the gauge sheet 54 and base plate 56 using a plurality of indexing pins 58 in a manner well known in the art. The indexing pins 58 extend upward from the surface of the base plate 56 and gauge sheet 54 and engage recesses (not shown) in the lower surface of the lower tool insert 50. After the lower tool insert 50 is indexed, the upper tool insert 52 and thus, upper U-shaped channel 38 is inverted and placed on top of the lower tool insert 50 and lower U-shaped channel 36 and aligned (FIGS. 7 and 8) in a manner well known in the art. For example, indexing pins (not shown) can extend upward from the upper surface of the lower tool insert 50 to engage recesses (not shown) in the lower surface of the upper tool insert 52.

Figure 9:
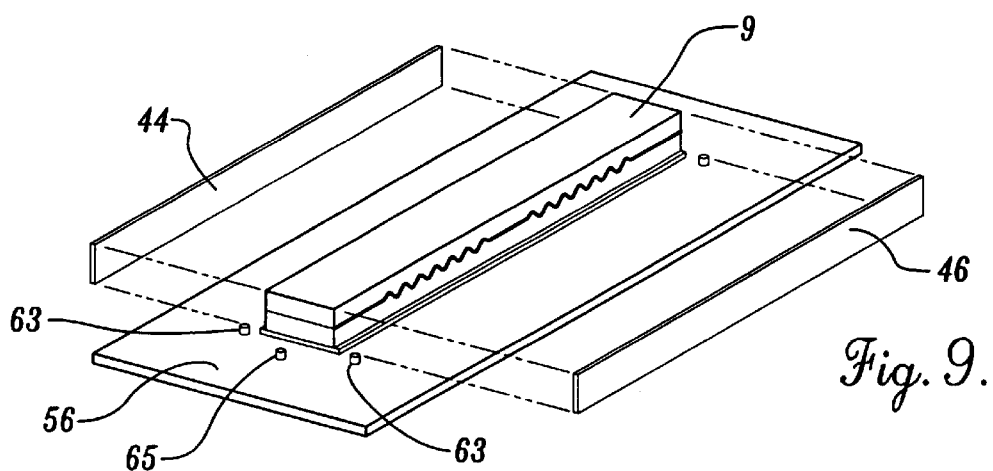
FIG. 9 is a partially exploded view of the upper and lower tool inserts and cap strips.

As the lower and upper tool inserts 50 and 52 are aligned and placed together, one surface of each of the lower and upper U-shaped channels 36 and 38 are placed in contact with each other, forming the central web 22 of the sine wave spar 20 (FIG. 1). Due to the rounded edges of the lower and upper tool inserts 50 and 52 and thus U-shaped channels 36 and 38, a triangular gap is formed along both edges of the intersection between the joined surfaces of lower and upper U-shaped channels 36 and 38. These triangular gaps are filled using the left and right radius fillers 40 and 42 (FIG. 5). The radius fillers 40 and 42 are placed in the triangular gaps and secured using a heat gun or other method as known by those of ordinary skill in the art. After the radius fillers 40 and 42 are in place, the left and right cap strips 44 and 46 are placed in contact with the joined flanges of the U-shaped channels 36 and 38 and radius fillers 40 and 42 as best seen in FIG. 9.

Figure 12:
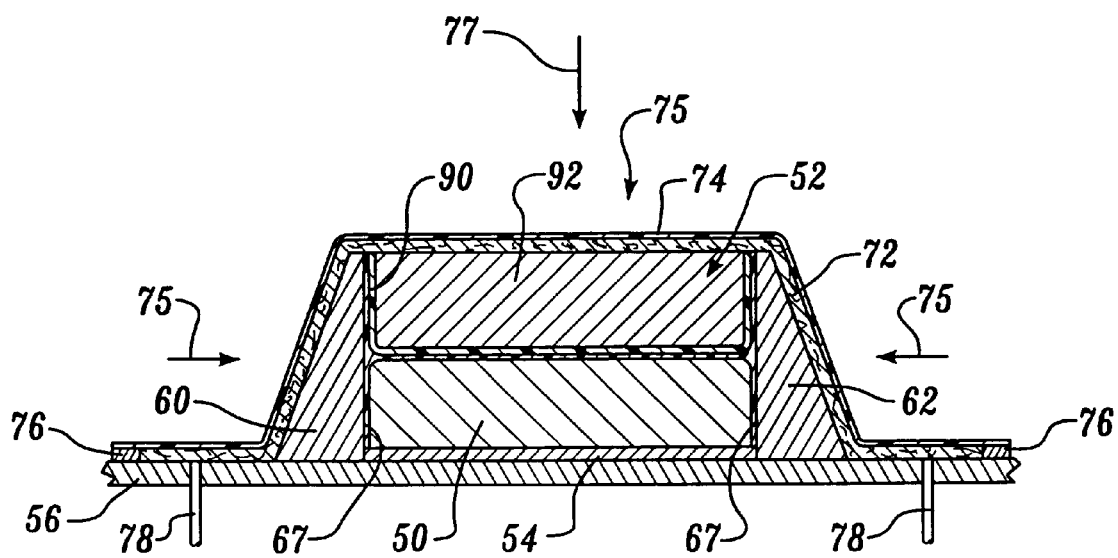
FIG. 12 is a transverse cross-section of the assembled sine wave spar tooling.

After the left and right cap strips 44 and 46 are in place, left and right side rail tools 60 and 62 (FIG. 10) are placed adjacent to the left and right cap strips 44 and 46. The left and right siderail tools 60 and 62 have rigid forming surfaces 67 (FIGS. 10 and 12) corresponding to the shape of the formed composite part. The left and right side rail tools 60 and 62 rest upon the base plate 52. The forming surfaces 67 of the side rail tools 60 and 62 define the dimensions of the exterior surfaces of the formed spar caps 24 and 26 (FIG. 1).

Depending upon the application, the left and right side rail tools 60 and 62 may be allowed to float, i.e., move in and out toward and away from the upper and lower tool inserts 50 and 52, during processing. Alternately, the left and right side rail tools 60 and 62 may be indexed into a predetermined position by indexing pin 63 (FIGS. 9 and 10) extending upward from the base plate 56. The indexing pins 63 are received within recesses (not shown) in the lower surface of the side rail tools 60 and 62.

Figure 10:
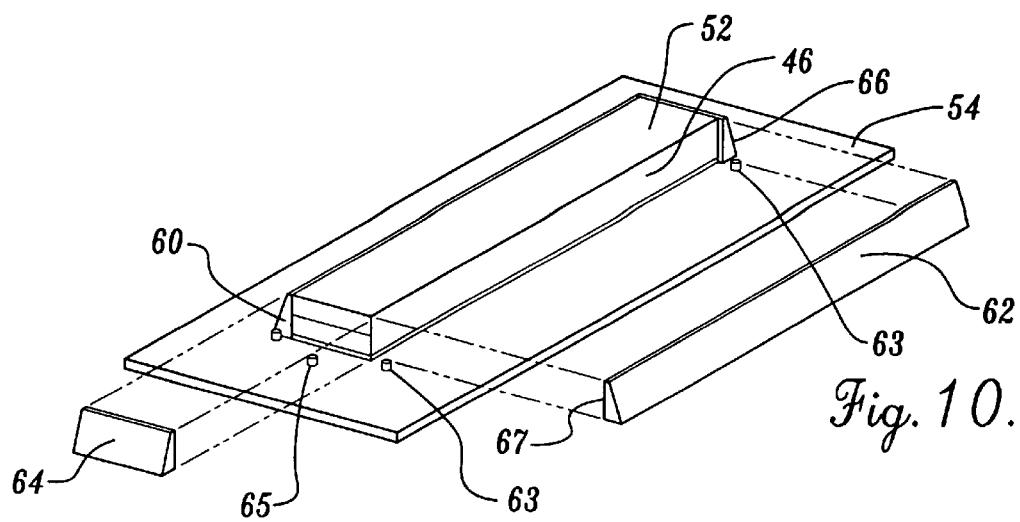
FIG. 10 is a partially exploded view of the upper and lower tool inserts and side rail tools.

After the side rail tools 60 and 62 are in place, end tools 64 and 66 may be placed on the opposite ends of the lower and upper tool inserts 50 and 52 (FIG. 10). The end tools 64 and 66 are indexed in place by indexing pins 65 that extend upward from the base plate 56. The indexing pins 65 engage recesses (not shown) in the lower surface of the end tools 64 and 66. Depending on the application, end tools may not be needed.

Figure 11:
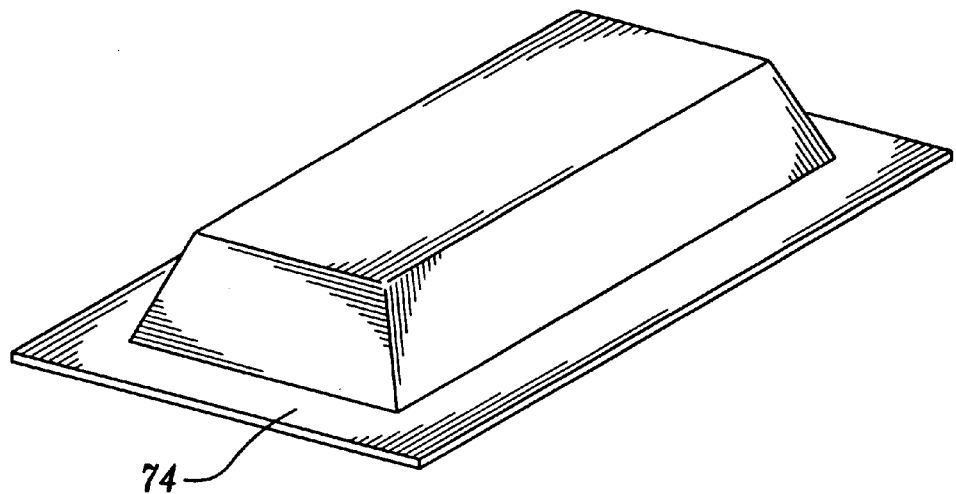
FIG. 11 is a perspective view of the assembled sine wave spar tooling.

The lower and upper tool inserts 50 and 52, side rail tools 60 and 62, and end tools 64 and 66 surround the composite material forming the composite workpiece that is to form the sine wave spar 18. As illustrated in FIG. 11, after the tooling is in place, it is covered by a cloth breather material 72. The cloth breather material 72 partially covers the surface of the base plate 56 and extends over the top of the left and right side rail tools 60 and 62, end tools 64 and 66, and upper tool insert 50. A vacuum bag 74 (FIGS. 11 and 12) is then placed over the top of the cloth breather material 72 and sealed to the base plate 56 along its edges using sealing material 76 in a manner well known in the art.

As well known in the art, it is also important to remove air and volatiles produced during processing of the composite material from the interior of the vacuum bag 74. In the preferred embodiment, air and volatiles within the vacuum bag 74 are removed by withdrawing them through exhaust ports 78 (FIG. 12) that extend upward through the base plate 56 and open into the interior of the vacuum bag 74. After the composite workpiece 23 is vacuum bagged, the combined tooling assembly and composite workpiece is placed within an autoclave (not shown) and the exhaust ports 78 are attached to the vacuum exhaust (not shown) of the autoclave. The autoclave is then closed and the interior of the autoclave is pressurized and heated in accordance with the processing requirements of the composite material used.

During processing, a vacuum is placed on the exhaust ports 78 to evacuate the interior of the vacuum bag 74. The vacuum may be placed on the exhaust ports 78 through the use of any appropriate vacuum device, such as the vacuum pump system of the autoclave. The combined pressure produced by the evacuation of the vacuum bag 74 and the pressurization of the autoclave produces a hydrostatic force that presses the upper tool insert 52 downward and the side rail tools 60 and 62 inward as illustrated by arrows 75. As the tools are pressed downward and inward, the forming surfaces of the tools contact the composite workpiece 23 and compress the workpiece in order to consolidate it. In addition to pressurizing the autoclave, the interior of the autoclave, and thus tooling and composite workpiece are heated to an appropriate processing temperature. The pressure and temperature are maintained in accordance with the processing parameters of the composite material until it is consolidated and cured.

The consolidation and cure cycles for various composite materials are readily known by those of ordinary skill in the art. The consolidation and cure cycles differ depending upon the material used and are available from the manufacturers of the composite materials used.

In alternate embodiments of the invention, other tooling concepts could be used to fabricate the sine wave spar 18. For example, the configuration of the tools or the arrangement of the indexing pins could be changed. Tooling concepts and methods of indexing tools are readily understood by those of ordinary skill in the art.

Although the preferred embodiment of the invention is described with respect to the use of an autoclave, other apparatus could be used to process the composite material. For example, the tooling assembly could be heated through the use of heating elements embedded within the tools, inductive heating, or through the use of other heating methods and apparatus. Similarly, although the preferred embodiment uses an autoclave to apply consolidation pressure to the composite workpiece, a mechanical apparatus, such as a press, could also be used.

The upper tool insert 52 includes a compliant forming surface 90 that is placed over a rigid support substructure 92 (FIG. 2). In the preferred embodiment, the compliant forming surface 90 is formed of a high density elastomer. The compliant forming surface 90 acts as a pressure intensifier that allows a fairly uniform pressure to be placed on the composite workpiece 23 during forming. The compliant forming surface 90 is supported by the rigid support substructure 92, thus maintaining dimensional tolerances on the surface of the compliant forming surface, and thus on the surface of the formed composite part.

As best illustrated in the exploded view of FIG. 2, the lower surface of the laid up composite workpiece 23 rests on the forming surface 54 of the lower tool insert 50. The forming surface 54 of the lower tool insert 50 defines the shape of the lower surface of the workpiece 23 after it is formed. Similarly, the forming surface 56 (FIG. 5) of the upper tool insert 52 defines the shape of the upper surface of the workpiece 23 after it is formed.

In the preferred embodiment, the lower tool insert 50 is formed of a thermally stable rigid tooling material such as invar. The upper tool insert 52 comprises both the rigid support substructure 92 and the compliant forming surface 90. The lower surface 110 of the compliant forming surface 90 defines the lower forming surface 56. In the preferred embodiment, the compliant forming surface 90 is approximately a constant thickness and has a plurality of tabs 106 that extend upward from the upper surface of the compliant forming surface.

The rigid support substructure 92 is sized and shaped so that it fits within a recess 107 in the compliant forming surface 90. The recess 107 is defined by the bottom and sides of the compliant forming surface 90. The rigid support substructure 92 has a lower surface 100 that approximately corresponds to the shape of the lower surface 110 of the compliant forming surface 90. However, the lower surface 100 of the rigid support substructure 92 includes a plurality of recesses 104. Each of the recesses 104 is positioned and sized to receive a corresponding tab 106 extending upward from the top of the compliant forming surface 90.

In the preferred embodiment, the recesses are 0.50 inches deep and 0.50 inches wide. However, in alternate embodiments, recesses 104 of other depths and widths could be used. In addition, in the preferred embodiment, the recesses 104 are dovetailed; however, in other embodiments, the recesses could be rounded, square, rectangular, etc.

In the preferred embodiment, the tabs 106 extend upward from the peaks in the forming surface 110 approximately across the width of the compliant forming surface 90. The recesses 104 extend into the lower surface of the rigid support substructure 92 at the location of the deepest valleys in the contour of the forming surface 100. The compliant forming surface 90 fits over the rigid support substructure 92 such that the tabs 106 extend into the recesses 104 while the walls of the compliant forming surface surround the sides of the rigid support substructure 92.

The tabs 106 are sized so that they have a cross-sectional dimension the same as that of the recesses 104. Once the tabs 106 are pressed into the recesses 104 they remain in position, thus attaching the compliant forming surface 90 to the rigid support substructure 92. The attachment between the rigid support substructure 92 and the compliant forming surface 90 is assisted by the interface between the walls of the compliant forming surface and the sides and bottom of the rigid support substructure 92.

As described above, after the tooling is assembled, the weight of the rigid support substructure 92 and compliant forming surface 90 presses downward on the upper surface of the composite workpiece 23. After the tooling and workpiece 23 are bagged and placed within an autoclave, as described above, the pressure inside the autoclave provides a further consolidation and forming pressure as illustrated by arrows 75 in FIG. 12.

The external force applied by the autoclave presses the rigid support substructure 92 downward into the compliant forming surface 90 which in turn, presses the compliant forming surface 90 downward onto the upper surface of the composite workpiece 23. At the same time, the autoclave pressure forces the side tools 60 and 62 inward as shown by arrows 75 in FIG. 12. This inward directed force presses the flanges on the upper half of the composite workpiece 26 into contact with the sides of the compliant forming surface 90 and the lower half of the flanges of the composite workpiece into the sides of the lower tool insert 50.

The downward and inward directed force provided by the autoclave pressurization thus, places a forming and consolidation pressure on the composite workpiece 23. Because the side tools 60 and 62 are formed of a rigid material their forming surfaces 67 determine the dimension of the exterior surfaces of the caps 24 and 26 of the formed composite sine wave spar 20 (FIG. 1). Similarly, the rigid forming surface 54 of the lower tool insert 50 ensures that the lower surface of the sine wave center web 22 and the interior surfaces of the lower portion of the caps 24 and 26 are maintained at a predetermined dimensional tolerance.

Because the forming surface 90 is compliant, it deforms slightly under the pressure of the downward and inward force 75 applied by the autoclave. This deformation allows the compliant forming surface 90 to conform and account for small thickness variations in the workpiece 23 on composite material used to form the workpiece. Similarly, the compliant forming surface 90 deforms slightly to account for slight errors in the positioning of individual plys of composite that form the composite workpiece 23. However, because the compliant forming surface 90 is supported by the rigid support substructure 92, the compliant forming surface maintains dimensional tolerances on the upper surface of the center web 22 and the interior surfaces of the upper portion of the caps 24 and 26 during forming. In most applications, the use of the compliant forming surface 90 combined with the rigid support substructure 92 produces a high quality composite sine wave spar free of voids and resin-rich areas while producing acceptable part dimensional tolerances.

During development of the present invention, several different materials were tried to determine the best material from which to form the compliant forming surface 90. It is important in selecting a material from which to form the compliant surface so that the material selected has a coefficient of thermal expansion compatible with the thermal expansion of the composite material used. The material found to produce the best result was a room temperature vulcanizing elastomeric rubber material sold by D. Aircraft Products under the name Dapco #60. However, in alternate embodiments of the invention, other compliant materials could be used to form the compliant forming surface 90. The best material to use can be influenced by the processing parameters of the composite material, the dimension of the part being formed, the tooling concept used as well as the cost and manufacturing concerns.

Dapco #60 is a room temperature vulcanizing (RTV) castable rubber material. The RTV rubber material has a relatively low shrinkage (less than 0.1%) when exposed to graphite composite materials during curing and a durometer of approximately 75 shore A. In the preferred embodiment, the RTV rubber material was mixed at a ratio of 100 parts by weight A (rubber) with four parts by weight B (hardener) using an electric mixer. After mixing, the RTV rubber material was deaerated to remove trapped air within the rubber compound.

In the preferred embodiment, the compliant forming surface 90 is formed by first forming a female mold having an interior contour corresponding to that desired for the forming surface 110 of the compliant forming surface 90. The premixed RTV rubber material is poured into the female mold to a sufficient level to cover the bottom of the mold and to leave enough excess material to form the compliant forming surface 90 as described below.

The rigid support substructure 92 is then lowered into the female mold on top of the mixture of RTV rubber material. As the lower surface of the compliant forming surface 90 contacts the RTV rubber material, it flows into the recesses 104. As the rigid support substructure 92 is lowered further, it displaces the RTV rubber material up around the sides of the rigid support substructure 92.

In the preferred embodiment, the dimensions of the rigid support substructure 92 are determined so that after the rigid support substructure 92 is lowered into the female mold a thickness of RTV rubber material of approximately ¼ inch remains between the exterior surface of the rigid support substructure 92 and the interior contour of the female mold.

In the preferred embodiment, the compliant forming surface of approximately ¼ inch was found to produce the best results. However, the most desirable thickness of the compliant forming surface 90 is a function of the shape of the composite part to be formed, the composite material and thus processing parameters used, the compliant material used, and the tooling concept used. Therefore, in other embodiments of the invention, the thickness of the compliant forming surface 90 may change to produce the best results.

After the rigid support substructure 92 is lowered into the female mold, the RTV rubber material is allowed to cure within the female mold in accordance with the manufacturer's processing parameters.

In the preferred embodiment, after placing the rigid support substructure 92 in the female mold, the RTV rubber material is cured at room temperature for at least 24 hours. The rigid support substructure 92, partially cured RTV rubber material and female mold are then placed in an oven at approximately 120° F. for a post cure of approximately four hours. The rigid support substructure 92 and formed compliant forming surface 90 are then removed from the female mold as a unit.

The combined rigid support substructure 92 and compliant forming surface 90 are then post cured in an oven that is ramped at 2° F. per minute to 250° F. and held for four hours. The oven is then ramped at 2° F./min to 350° F. and held for four hours and, finally ramped at 2° F./min to 410° F. and held for four hours.

In the preferred embodiment, the curing and post curing schedule described above were used for both ¼ inch thick and ½ inch thick compliant forming surfaces 90. Both ¼ and ½ inch thick compliant forming surfaces 90 produced good results. However, the ¼ inch thick compliant forming surface produced the best results.

In alternate embodiments of the invention, the durability of the compliant forming surface 90 can be increased by adding chopped fiberglass or other reinforcing fibers to the RTV rubber compound during casting. In yet other embodiments, a durable protective surface coating can be applied to the compliant forming surface 90 after casting.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A tooling system for forming a composite part, comprising:

an elastomeric, compliant covering seated on a rigid substructure and attached through retaining tabs projecting from the covering, the tabs being received in corresponding recesses in the substructure, the covering including a forming surface; and at least one other tool to create a set of matched tooling, the other tool having a forming surface for complementary arrangement with the forming surface of the covering on the substructure so that the forming surfaces of the covering and tool define the geometry of the composite part, the forming surfaces being designed to apply a substantially constant consolidation pressure on the part during forming and curing, the covering on the complaint tool having a shrinkage of less than about 0.1% to hold dimensions of the part.

2. The tooling system of claim 1, wherein the forming surfaces of the tools define at least part of the geometry of a wine wave spar.

3. The tooling system of claim 2, wherein the forming surfaces of the tools define the geometry of a central web of the sine wave spar and wherein the tooling system includes opposing side tools having forming surfaces that define the geometry of opposing caps of the sine wave spar.

4. The tooling system of claim 2, wherein the compliant covering has a forming surface in the shape of a sine wave, and wherein the tabs of the compliant covering are located substantially at the peaks of the sine wave.

5. The tooling system of claim 1, wherein the compliant covering has a substantially constant thickness.

6. The tooling system of claim 1, wherein the rigid substructure includes a contoured surface having approximately the same contours as the outer surface of the compliant covering, wherein the compliant covering has a substantially constant thickness, and wherein the compliant covering seats on the contoured surface of the rigid substructure.

7. The tooling system of claim 1, wherein the compliant covering is rubber.

8. A tooling system for forming a composite sine wave spar having a central sine wave web that extends between opposing spar caps, comprising:

(a) a first tool formed of a rigid material and having a forming surface contoured to form one side of the sine wave spar; and (b) a matching, second tool having a forming surface contoured to form the opposite side of the sine wave spar, including a rigid substructure having a support surface with a contour that approximates the contour of the forming surface and a compliant, elastomeric covering having a shrinkage of less than about 0.1%, one side of the covering overlaying, conforming to, and being attached to the support surface with a plurality of retaining tabs that extend from the covering into and are received within recesses in the substructure, generally at a period of one wavelength for the sine wave, for attaching and holding the covering in place on the substructure, the tabs being generally opposite the forming surface.

9. The tooling system of claim 8, wherein the compliant covering is rubber.

10. The tooling system of claim 8, wherein the forming surfaces of the first and second tools define the dimensions and contour of the sine wave web.

11. The tooling system of claim 10, further comprising opposing side tools having forming surfaces that define the dimensions of the left and right spar caps.

12. An insert for a tooling system for forming a fiber-reinforced resin composite to close dimensional tolerance, generally at elevated temperatures and pressures in an autoclave, comprising:

a body generally corresponding in shape to the configuration of the composite in a region defining a forming surface of the body, the body being a compliant, high density elastomeric material of relatively low shrinkage of less than about 0.1% and of a durometer hardness of about 75 shore A, the material being able to withstand the elevated temperatures and pressures, wherein the body includes connecting tabs for connecting the body through corresponding tab-receiving recesses to a rigid support substructure.

13. The insert of claim 12 wherein the material is rubber.

14. The insert of claim 13 wherein the rubber is vulcanizable at room temperature.

15. The insert of claim 14 further comprising a protective coating on the material and adhered to the forming surface for improving durability of the insert.

16. The insert of claim 14 wherein the body includes reinforcing fiber in the material.

17. The insert of claim 16 wherein the reinforcing fiber includes chopped fiberglass.

18. A tool for composite forming comprising the insert of claim 12 and a rigid support substructure connected to the body by receiving the tabs in tab-receiving recesses.

* * * * *